Dec. 10, 1935.  F. UHLMANN  2,023,754
PROCESS FOR THE CRACKING OF HEAVY OILS AND APPARATUS THEREFOR
Filed Dec. 23, 1931  2 Sheets-Sheet 1

Inventor:
Fritz Uhlmann
By Alexander Powell
Attorneys

Dec. 10, 1935.   F. UHLMANN   2,023,754
PROCESS FOR THE CRACKING OF HEAVY OILS AND APPARATUS THEREFOR
Filed Dec. 23, 1931   2 Sheets-Sheet 2
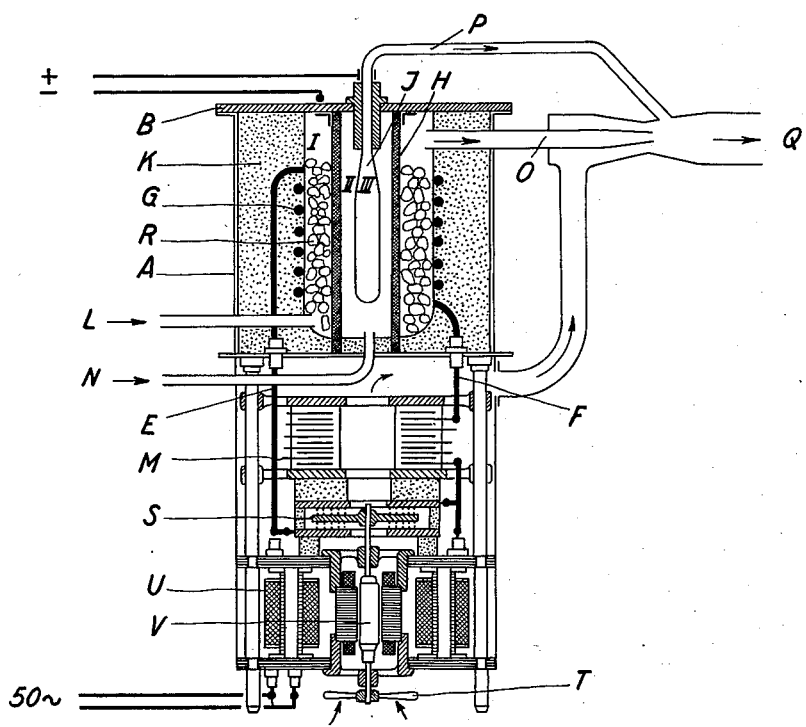
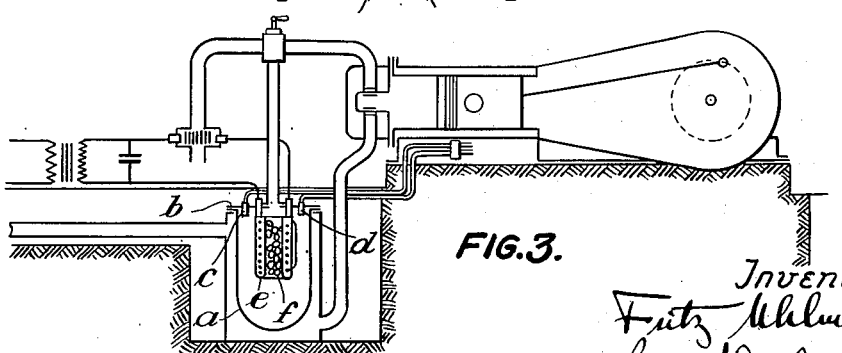

Patented Dec. 10, 1935

2,023,754

UNITED STATES PATENT OFFICE 2,023,754

PROCESS FOR THE CRACKING OF HEAVY OILS AND APPARATUS THEREFOR

Fritz Uhlmann, Berlin, Germany, assignor to Aktis Aktiengesellschaft, Schaffhausen, Switzerland, a corporation of Switzerland Application December 23, 1931, Serial No. 582,849
In Germany December 31, 1930

8 Claims. (Cl. 204—31)

The final object of the process for cracking oils for obtaining gas is to produce such a redistribution of the hydrogen in the less valuable mixture of ingredients with a high boiling point which are left behind after distillation as to ensure that some of the constituents will be enriched in hydrogen at the expense of others which lose hydrogen. There is therefore left behind a very heavy residue but it has been previously suggested to recover more light oil by a simultaneous supply of hydrogen.

The present invention relates to a process for conducting the cracking in such a manner as to produce, with the use of highly superheated steam, lighter hydrocarbons in the form of gas or vapour, the heavy oils to be treated after having been converted into vapour with superheated steam being passed through a high frequency electric field. The gaseous mixture produced can be either collected for subsequent use or used immediately in a gas engine for example. In the latter case it has been found that the engines worked in this way yield considerable power and if they are gas engines, work with advantage with a smaller compression than usual. No coke residue is left, and no carbon is deposited on the pistons and on the sparking plugs. The waste heat of the cooling water, like the heat of the combustion gases is utilized for steam generation or for the superheating of the steam required for cracking.

The process is subsequently described by way of example, firstly in connection with a gas engine worked with the gases and vapours obtained, it being assumed that the engine started with town gas and run until it is warm, so that warm cooling water and exhaust gases will be available for starting the cracking. Part of the energy supplied by the engine, about 10%, will be required for generating the field, and the remainder will be available for other purposes.

A small pump driven by the gas engine injects the oil to be treated through a nozzle into a superheater which is played upon by the hot exhaust gases. This superheater is supplied by another pump with part of the warmed cooling water through a second superheater in the form of hot steam. The mixture of water and oil vapours thus produced by the engine through a carburettor in which it is exposed to the action of the field at about 500,000–800,000 periods per second. Ignition takes place in the manner usual in gas engines.

Figure 1 of the accompanying drawings shows diagrammatically the arrangement of the electric high frequency apparatus.

Fig. 2 shows a modified form using a rotary spark gap.

Fig. 3 shows the gas generator amended to a cylinder engine.

Figure 1:
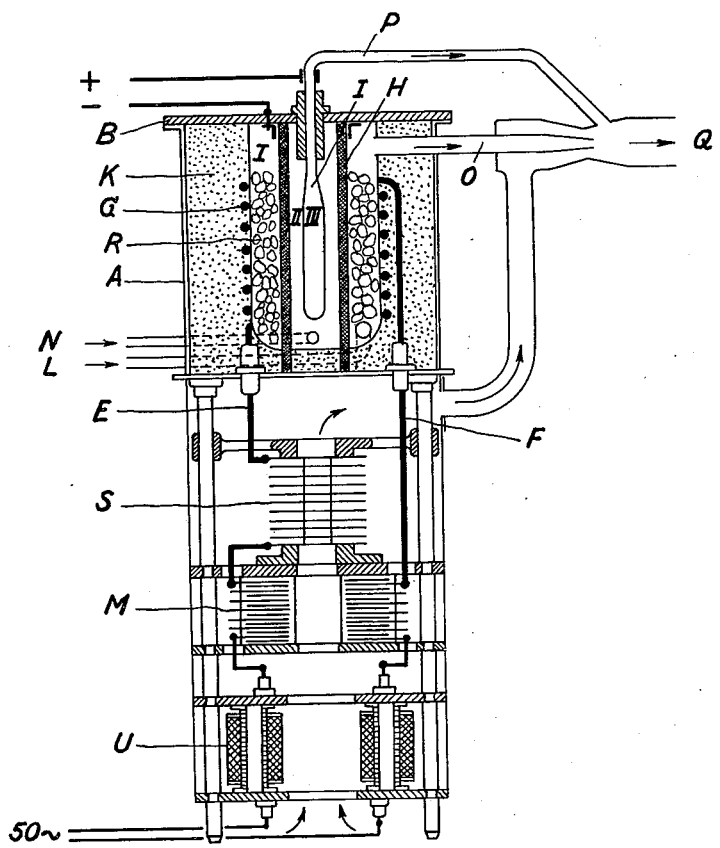

U is the transformer fed with current, of 220 volts and 50 periods per second for example the ratio of transformation of which is say 1 to 50. M is a condenser, S a quenched or rotary spark gap, G the coil and R a charge of coke.

An electric direct current field is simultaneously superposed over the high frequency field and porous walls H and I of appropriate shape, manufactured by the process described in the specification of German Patent No. 405,880, are inserted. Moreover the air required for the combustion of the gas is drawn in through the spark gap S arranged outside the high frequency field; moreover the oxygen generated in the field is mixed with this air in order to enrich it with oxygen and also in order to prevent the appearance of carbon monoxide (CO) or carbonic acid ($CO_2$) in the field itself.

In a cylindrical iron vessel A provided with an insulating lining K is a cylinder H made of porous metal similar to the walls H and I and a similar porous bottle J is inserted in this cylinder. The vessel is therefore divided into three chambers; chamber I between the coil G and the cylinder H, chamber II between the cylinder H and the bottle J, and chamber III in the interior of the bottle J. All the processes take place in the high frequency coil G arranged around the chambers I, II, and III. The chamber I is partly filled with coke and has a supply pipe L which supplies the oil to be treated to this chamber and also a pipe O for the discharge of the products obtained. The superheated steam is supplied to the chamber II through the pipe N. The chamber III has a discharge pipe P for the oxygen generated. The porous cylinder J is connected to the positive, and the cylinder H to the negative pole of the superposed direct current; the latter has a potential of say 500–1000 volts. As the two porous cylinders are situated in the high frequency field they will be heated by eddy currents. The plates of the quenched spark gap or the pole points of the rotary spark plug S are provided with a frittendon coating of metals of high order numbers, such as molybdenum, tungsten, bismuth and the like.

The arrangement of the electric apparatus renders it possible to utilize the suction air required for combustion for the cooling of the individual parts of the same. This ensures that the air will be enriched with oxygen compounds not only by the spark gap but also by the condenser. For this purpose the condenser M is suitably constructed so as to assist in the production of a spray action.

If the new process is intended for utilizing the cracking products obtained directly for the working of gas engines or of heating installations, the oxygen will be conveyed through the pipe P, and the products of cracking through the pipe O, to the above mentioned point at Q otherwise the oxygen and the cracking products may be collected separately. Care must be however always taken to see that the products of cracking are discharged as quickly as possible from the generating zone.

If the mixture of gas and oil vapours produced is not to be used at once for working an engine etc. but to be stored, it is drawn from the carburettor by a pump and delivered through a cooling device to a gas holder. The condensates are then submitted to a further treatment in the usual manner. Care should be taken in any case to see that the converted substances are not exposed to the action of the field for an unnecessarily long time after their generation.

The cracking process described is found to be particularly valuable for the manufacture of oil gas for lighting purposes or as raw material for the chemical industry, because it enables oil to be gasified without the use of large quantities of coke.

By the action of the direct current superposed in chamber II, the superheated steam is ionized in such a manner that the oxygen generated is mainly supplied to chamber III, and the hydrogen generated chiefly to chamber I.

It has been found particularly advantageous to use for the coil a compound manufactured by fritting finely pulverized silver, bismuth, copper, molybdenum, tungsten, uranium, lead, cobalt, nickel, iron, manganese and tantalum or mixtures of the same as described in the specification of German Patent No. 405,880. According to the process described therein metal powders or metal powder mixtures are fritted together in the high frequency field, even mixtures which otherwise do not form alloys, and the term metal powder mixtures may also include, powders of non-metallic substances.

Figure 2 of the accompanying drawings shows the same arrangement as Figure 1, but with rotary spark gap. It has been found that the nitrogen in the air drawn through the spark gap S is left behind so to speak as a cushion and filter, and only the oxygen passes on.

A long series of experiments has shown that greater advantages can be obtained if the working gases obtained are supplied immediately to a gas engine in the form of a cylinder engine. As will be seen from Figure 3, this involves the utilization at the same time of the temperature of the exhaust gases of such an engine which in escaping heat a container $a$. Through two nozzles $c$ and $d$ in this container closed by the cover $b$ the pumps inject one part of cooling water and one part of the working gas mixed in suitable proportions. The superheated steam and oil vapour thus produced are drawn at each suction stroke of the engine through the field of a solenoid coil $e$ suspended in the interior of the container into the engine in order to be burnt or exploded therein. The interior of this coil is filled with pieces of coke $f$ which are intended for the further special purpose as this solenoid coil $e$ is fed with a high frequency current in order to produce a zone of passage through the magnetic field of force thereby generated within which zone the passing gases are still further compressed that is to say more completely combined. The high grade hydrocarbon gases thus generated render it possible to directly drive the attached gas engine or a combustion turbine, for working which it is then necessary to have only slight compression in order to ignite these gases by a simple spark.

Having now particularly described and ascertained the nature of our said invention and in what manner the same is to be performed we declare that what we claim is:

1. A process for producing hydro-carbons of low boiling point from heavy oils, consisting in passing oil or oil vapor over coke within a high-frequency field, and at the same time cracking water by electrolysis within the high-frequency field to liberate hydrogen for combining with the oil vapors.

2. A process for producing hydro-carbons of low boiling point from heavy oils, consisting in passing oil or oil vapor over coke within a high-frequency field, and introducing steam into the high-frequency field and cracking the water vapors by electrolysis within the high frequency field to liberate hydrogen for combining with the oil vapors.

3. An apparatus for producing hydro-carbons of low boiling point from heavy oils, comprising three concentric chambers separated by porous metallic walls; an electric coil around the outer chamber adapted to set up a high frequency metallic field; means for introducing coke and heavy oils within the outer chamber, an outlet therefrom; means for introducing superheated steam within the middle chamber; an outlet from the inner chamber discharging into said first mentioned outlet; and a direct current circuit; the wall of the inner chamber being connected to the positive wire and the wall of the middle chamber connected to the negative wire of the direct current circuit.

4. In apparatus as set forth in claim 3, the coke comprising coke rings arranged in superposed layers.

5. In apparatus as set forth in claim 3, the coil consisting of fritted metallic powders.

6. An apparatus for producing hydrocarbons of low boiling point from heavy oils, comprising a porous metallic cylinder; a porous metallic chamber within the cylinder; a casing of insulating material around and spaced from the cylinder; an electric coil in said casing; means for introducing coke and heavy oils between the cylinder and coil, an outlet therefrom; means for introducing superheated steam within the cylinder; an outlet from the chamber discharging into said first mentioned outlet; and means for producing a high-frequency field around the electric coil; and a direct current circuit; the chamber being connected to the positive wire and the cylinder to the negative wire of a direct current circuit.

7. In apparatus as set forth in claim 6, the coke comprising coke rings arranged in superposed layers.

8. In apparatus as set forth in claim 6, the coil consisting of fritted metallic powders.

FRITZ UHLMANN.